US007370409B2

(12) United States Patent
Ritter

(10) Patent No.: US 7,370,409 B2
(45) Date of Patent: May 13, 2008

(54) METHOD AND APPARATUS FOR TRANSFERRING WIRES THAT HAVE BEEN CUT INTO LENGTHS FROM A WIRE BUNDLE INTO A SINGLE LAYER

(75) Inventor: Klaus Ritter, Graz (AT)

(73) Assignee: EVG Entwicklungs- u. Verwertungs-Gesellschaft m.b.H., Raaba (AT)

( * ) Notice: Subject to any disclaimer, the term of this patent is extended or adjusted under 35 U.S.C. 154(b) by 110 days.

(21) Appl. No.: 11/302,916

(22) Filed: Dec. 13, 2005

(65) Prior Publication Data

US 2006/0160386 A1 Jul. 20, 2006

(30) Foreign Application Priority Data

Dec. 13, 2004 (AT) ............................ A 2090/2004

(51) Int. Cl.
*H01R 43/00* (2006.01)
*B65G 47/12* (2006.01)

(52) U.S. Cl. ............................ 29/825; 140/1; 198/443; 198/453

(58) Field of Classification Search .................. 29/825; 140/1; 198/443, 453
See application file for complete search history.

(56) References Cited

FOREIGN PATENT DOCUMENTS

| | | | |
|---|---|---|---|
| DE | CH442150 | * | 8/1967 |
| DE | 2134886 | * | 2/1973 |
| WO | WO 01/38020 A1 | * | 11/2000 |

* cited by examiner

*Primary Examiner*—C. J Arbes
(74) *Attorney, Agent, or Firm*—Cohen Pontani Lieberman & Pavane LLP

(57) ABSTRACT

A method and an apparatus for extricating and transferring wires cut into lengths from a loose, random wire bundle (B) into a single layer (L) of parallel wires, in which first the loose, random wire bundle is fanned out into a plurality of random wire layers, and from the fanned-out, random wire layers, a partial bundle (T, T') is extracted and put into the operative range of a portioning device (4, 4'), whereupon a plurality of wires (D) are extracted simultaneously as an intermediate bundle (Z) from the partial bundle and, for forming a bundle to be combed out (K), are put into the operative range of a plurality of combing-out devices (33); then for ordering the wires (D) of the bundle to be combed out, one wire (D2) at a time is engaged in succession by a combing-out device (33'; 33") and combed out, and the combed-out wire then slides and/or rolls by gravity on inclined faces (20, 20'; 24) into the single layer.

2 Claims, 4 Drawing Sheets

METHOD AND APPARATUS FOR TRANSFERRING WIRES THAT HAVE BEEN CUT INTO LENGTHS FROM A WIRE BUNDLE INTO A SINGLE LAYER

FIELD OF THE INVENTION

The invention relates to a method and an apparatus for extricating and transferring wires that have been cut into lengths from a loose, random wire bundle into a single layer of parallel wires.

BACKGROUND OF THE INVENTION

A method and an apparatus of this generic type are known from Austrian Patent Disclosure AT-B 408 959. In it, from a bundle of loose, random wires, a smaller partial bundle is first extracted with the aid of a preportioning device and put into the operative range of a plurality of combing-out devices. For ordering the wires in the partial bundle, the wires are individually engaged in succession by the combing-out devices and combed out. Next, the combed-out wire rolls and/or slides individually by gravity into the single layer. This method and apparatus have the disadvantage that wires with a ribbed surface, as is usual for reinforcing steels, are tangled in such a way that they cannot be reliably separated into individual wires in a single work step, that is, with only a portioning device.

From Austrian Patent Disclosure AT-B 408 960, a method and an apparatus for extricating and separating steel wires that have been cut into lengths are known. Here, first a plurality of wires are taken from a bundle and put in an intermediate repository, which is located in the operative range of a separator device. For separating them, the wires are taken from the intermediate repository individually and in succession by the separator device with the aid of a magnetic force and delivered with a mutual lateral spacing to a downstream conveyor device; the wires are then stripped off by the separator device in a controlled way. This method and apparatus have the disadvantage that wires with a ribbed surface, as are usual in reinforcing steels, are tangled in such a way that they cannot be reliably separated by magnetic force in a single work step, that is, without a combing-out device. Moreover, this method can be employed only for magnetic materials.

SUMMARY OF THE INVENTION

It is one object of the invention to avoid the disadvantages of the known methods and apparatuses described and to create a method and an apparatus of the type defined at the outset that make it possible with structurally simple means to extricate wires from a bundle of random wires cut into lengths and to feed them without hindrance and continuously into a wire guide conduit, in which they are arranged in a single layer, so that the wires can be transferred individually to a downstream consumer.

This and other objects are attained in accordance with one aspect of the present invention directed to a method with which first the loose, random wire bundle is fanned out into a plurality of random wire layers, and from the fanned-out, random wire layers, a partial bundle is extracted and put into the operative range of a portioning device, whereupon from the partial bundle, a plurality of wires are simultaneously extracted as an intermediate bundle and, for forming a bundle to be combed out, put into the operative range of a plurality of combing-out devices; that then for ordering the wires of the bundle to be combed out, one wire at a time is engaged in succession by a combing-out device and combed out, and the combed-out wire then slides and/or rolls on inclined faces by gravity into the single layer.

Another aspect of the invention is directed to an apparatus for performing the method, having a repository for the wire bundle, a device for extracting a partial bundle from the wire bundle, an intermediate shelf for the partial bundle that has been extricated, a wire guide conduit that is inclined relative to the horizontal, a movement device for the wires located in the intermediate shelf, and a device for handing over the wires to a downstream consumer, and having the further characteristics that a fanning device is provided for fanning out the wire bundle and an extraction device is provided for extracting the partial bundle of wires from the fanned-out layers of wire; that a portioning device is provided for extracting the intermediate bundle, transferring it into the operative range of the combing-out devices, and forming the bundle to be combed out; and that each combing-out device has a plurality of continuously drivable combing-out wheels, which are distributed preferably uniformly over the length of the wires to be processed and are provided with teeth for combing out the wires, the direction of rotation of the combing-out wheels being oriented counter to the direction of inclination of the wire guide conduit.

The wire guide conduit can comprise a plurality of parallel wire chutes, each of which is formed of a pair of cooperating, parallel-extending guide ledges, the lower guide ledges on their upper end having a less-inclined contour acting as a slide sheet for the bundle to be combed out and on their lower end protrude past the upper guide ledges and are provided with a stop for the wires emerging from the wire chutes.

DETAILED DESCRIPTION OF THE DRAWINGS

The apparatuses shown in FIGS. 1*a* through 4 serve to extricate wires D, which have been cut into lengths, from a bundle B of random wires D and to transfer the wires D into single layer L, as well as to deliver the separated wires D' subsequently to a downstream consumer. The surface of the wires D, D' may be smooth or, as is usual in reinforcing steels, it may have a ribbed surface.

Figures 1A, 1B:
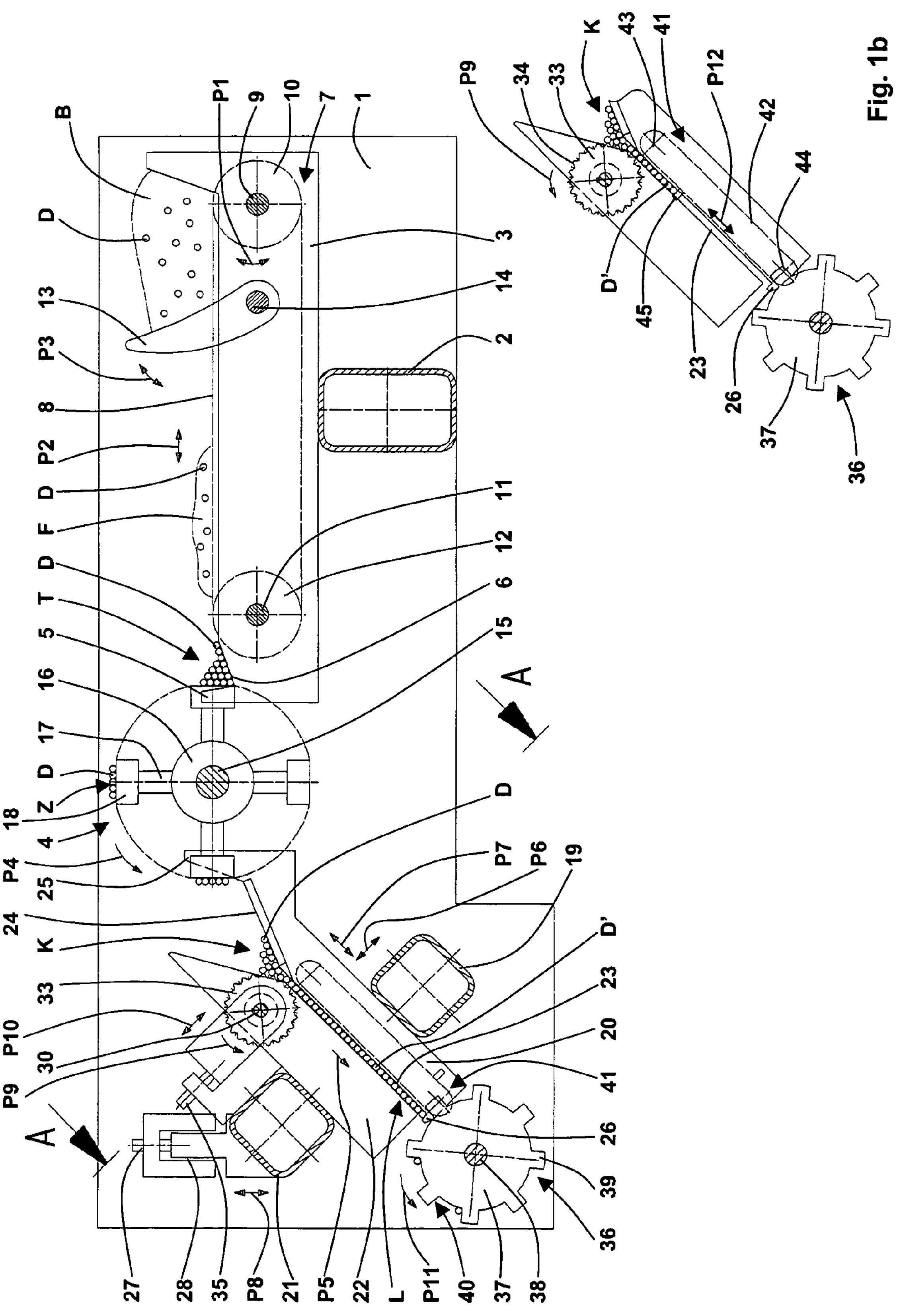
FIG. 1*a* is a schematic side view of one exemplary embodiment of an apparatus in accordance with the invention.
FIG. 1*b* is a detail of the exemplary embodiment of FIG. 1*a* during the initial outfitting.

The exemplary embodiment shown schematically in FIGS. 1*a* and 1*b* of an apparatus according to the invention has two stationary, vertical side plates 1, which are joined by a crossbeam 2. The crossbeam 2 supports a bundle holder 3 for the loose, random wire bundle B. The bundle holder 3 comprises two spaced-apart metal sheets, which in their outlet region have a stop 5 along with a collection tray 6 for the wires D and which protrude into the operative range of a portioning device 4. Extending parallel to the bundle holder 3 is a fanning out and conveyor device 7, which has two horizontally extending fanning and conveyor chains 8. Each fanning and conveyor chain 8 is driven in the directions of the double arrow P2 by a drive wheel 10 which is drivable in the directions of the double arrow P1 and is disposed in a manner fixed against relative rotation on a common shaft 9 supported in the bundle holder 3, and each fanning and conveyor chain is also guided over a deflection wheel 12 disposed on a common shaft 11.

Two coil openers 13 that can be pivoted in the directions of the double arrow P3 are disposed in the inlet region of the bundle holder 3 in a manner fixed against relative rotation on a common shaft 14 supported in the bundle holder 3.

The portioning device 4 has two magnet wheels 16, connected in a manner fixed against relative rotation to a shaft 15 supported in the side plates 1, and these magnet wheels can be driven jointly in the direction of the arrow P4. Between the magnet wheels 16 are a plurality of magnet bars 17, distributed over the circumference, which extend parallel to the shaft 15 and each have one magnet 18 on their cantilevered ends. Within the scope of the invention, instead of the magnet wheels and magnet bars, a rotatable roller body may be used, over whose circumference a plurality of magnets are disposed for firmly holding the wires of the intermediate bundle Z. Within the scope of the invention, the magnets 18 may be permanent magnets or electromagnets. Because of the use of the magnet wheels 16, this apparatus can be employed only for wires of magnetic material.

A plurality of lower guide ledges 20 extending parallel to one another are disposed on a lower guide ledge holder 19 extending between the side plates 1; these guide ledges extend perpendicular to the longitudinal direction of the wires D in the bundle K to be combed out. A plurality of upper guide ledges 22, extending parallel to one another and likewise perpendicular to the longitudinal direction of the wires D in the bundle K to be combed out, are disposed in such a way on an upper guide ledge holder 21, extending between the side plates 1, that together with the diametrically opposite, lower guide ledges 20, in pairs, they each form one wire chute 23.

All the wire chutes 23 together form one wire guide conduit. The lower and upper guide ledges 20; 22 are disposed such that the wire chutes 23 are inclined downward relative to the horizontal. Because of this inclination, the wires D' slide downward in the direction of the arrow P5 in the wire chutes 23. The lower guide ledges 20 have a contour on their upper end that is inclined only slightly from the horizontal and serves as a slide plate 24 for the bundle K to be combed out that has been extracted by the portioning device 4. The upper end of the lower guide ledges 20 protrudes into the operative range of the portioning device 4 and has a preferably vertically extending stripper edge 25. The lower guide ledges 20, on their lower end, protrude past the upper guide ledges 22 and have a stop 26 on that end.

The lower and upper guide ledges 20; 22 are distributed uniformly over the width of the corresponding guide ledge holders 19; 21 and are arranged parallel to one another, with lateral spacing from one another. The number of guide ledges 20; 22 and their lateral spacing from one another are adapted to the maximal length and to the diameter of the wires D in the bundle K to be combed out and are selected such that the wires D will be guided exactly and securely in a single layer in the wire chutes 23.

With the aid of an adjusting device, which essentially has an adjusting spindle 27 and a guide 28, the upper guide ledge holder 21 can be roughly adjusted in the directions of the double arrow P8, in order to adapt the inside diameter of the wire chutes 23 to the diameter of the wires D to be separated. Within the scope of the invention, the adjustment may be done by other adjusting devices, such as hydraulic or pneumatic adjusting devices or adjusting devices driven by electric motors.

The lower guide ledge holder 19 can be finely adjusted in the directions of the double arrows P6 and P7, in order on the one hand to adapt the inside diameter of the wire chutes 23 to the diameter of the wires D to be separated and on the other to displace the stop 26 in such a way that the lower guide ledges 20 protrude past the upper guide ledges 22 by only somewhat more than the diameter of the wire D' to be separated, and that only one wire D' can leave the wire chutes 23. To prevent the wires D' located in the wire chutes 23 from sliding uncontrollably downward and as a result being forced out of the wire chutes 23, it is possible within the scope of the invention to close the outlet opening with a spring-loaded cover prong, which opens only upon an intentional extraction of a wire D'.

In the upper region of the wire chutes 23, a plurality of shaft bearings 29 (FIG. 2), which receive a rubber shaft 30, are secured in the upper region of the wire chutes 23. The rubber shaft 30 is driven by a drive motor 31 via a coupling 32 in the direction of the arrow P9. A plurality of combing-out wheels 33 are disposed on the rubber shaft 30 in a manner fixed against relative rotation, and one combing-out wheel 33 is assigned to each pair 20; 22 of guide ledges, so that the combing-out wheels 33 are likewise distributed uniformly over the length of the wires D to be processed. However, it is also possible within the scope of the invention to select the distribution of the combing-out wheels 33 such that in the middle region of the wires, the lateral spacings of the combing-out wheels 33 are less than in the peripheral regions. Each combing-out wheel 33 has the form of a sprocket wheel and has a plurality of teeth 34 distributed over its circumference; the size and depth of the interstices between the teeth 34 is adapted to the diameter range of the wires D to be separated. The tips of the teeth 34 are rounded and are flush with the lower edge, forming the wire chutes 23, of the upper guide ledges 22. With the aid of a plurality of adjusting spindles 35, the rubber shaft 30 is finely adjustable in the directions of the double arrow P10, so that any sagging and production variations can be compensated for.

An ejector 36 is disposed on the lower end of the wire chutes 23 and comprises a plurality of disks 37. All the disks 37 are disposed in a manner fixed against relative rotation on a shaft 38 that can be driven in the direction of the arrow P11, and they have a driver protrusion 39 or a plurality of driver protrusions 39 distributed over the circumference, which extend into the range of the wire resting on the stop 26 of the lower guide ledges 20. Each of the driver protrusions 39 enclose a wire compartment 40 for receiving a separated wire D'. From the ejector 36, the separated wires D' are delivered to a downstream consumer, such as a welding machine for making wire gratings. Within the scope of the invention, it is possible to fill all of the wire compartments 40 with one wire D' each and/or not to equip selected wire compartments 40 with wires D'. Within the scope of the invention, it is furthermore possible, by suitable rotary motion of the separating disks 37, to equip the wire compartments 40 each with two wires, for instance for processing so-called double wires in the downstream consumer.

For filling the wire chutes 23 for the first time, a filler device 41 is provided. The filler device 41 has a plurality of filler chains 42, whose runs extend parallel to the wire chutes 23. The filler chains 42 are driven jointly via a drive mechanism 43 in the directions of the double arrow P12 and are guided over deflection wheels 44. Each filler chain 42 has one filler thumb 45, which protrudes into the wire chutes 23 and closes them off at the bottom. In FIG. 1*b*, the filler device 41 is shown in a snapshot during the filling of the wire chutes 23 for the first time. By reversing the direction of motion P12, it is possible within the scope of the invention to empty the wire chutes 23 with the aid of the filler device 41.

Figure 2:
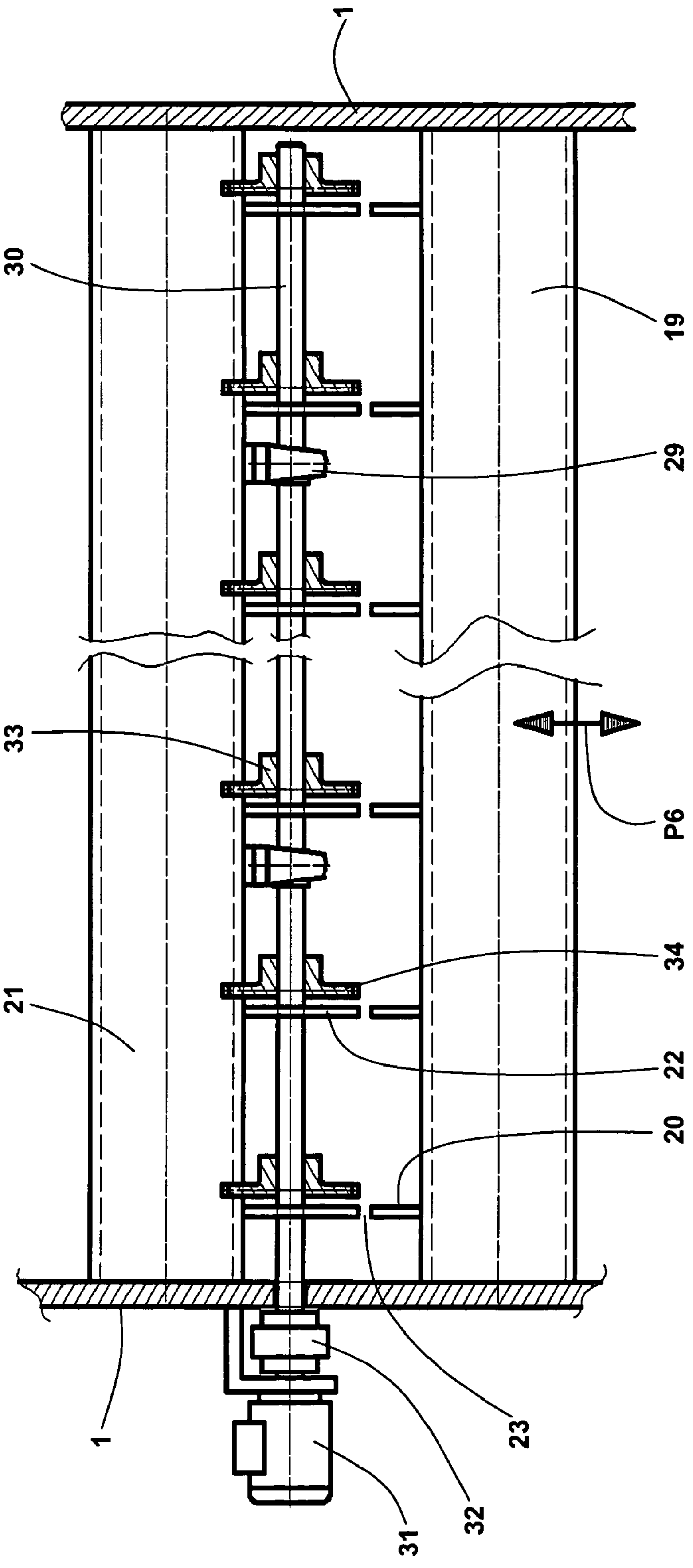
FIG. 2 is the cross-section A-A of FIG. 1*a* viewed in the direction of the arrows.

The apparatus shown in FIGS. 1*a* and 1*b* functions as follows:

A bundle B of random wires D is placed on the fanning and conveyor chains 7; as shown in FIG. 1*a*, the coil openers 13 are in an upward-pivoted working position. Once the binding wires of the wire bundle B have been severed, the coil openers 13 are pivoted downward into their outset position, as shown in FIG. 2, below the bundle holder 3, and as a result the wires D of the wire bundle B roll away from one another and spread out over the fanning and conveyor chains. In order to fan out the wires D in a purposeful way on the fanning and conveyor chains 7, the fanning and conveyor chains 7 can be moved at high frequency and low amplitude in both directions of the double arrow P2. After the fanning out has been done, the fanning and conveyor chains 7 feed the wires D against the wire stop 5 until such time as a partial bundle T has formed in a collection tray 6 upstream of the wire stop 5.

Figure 3A:
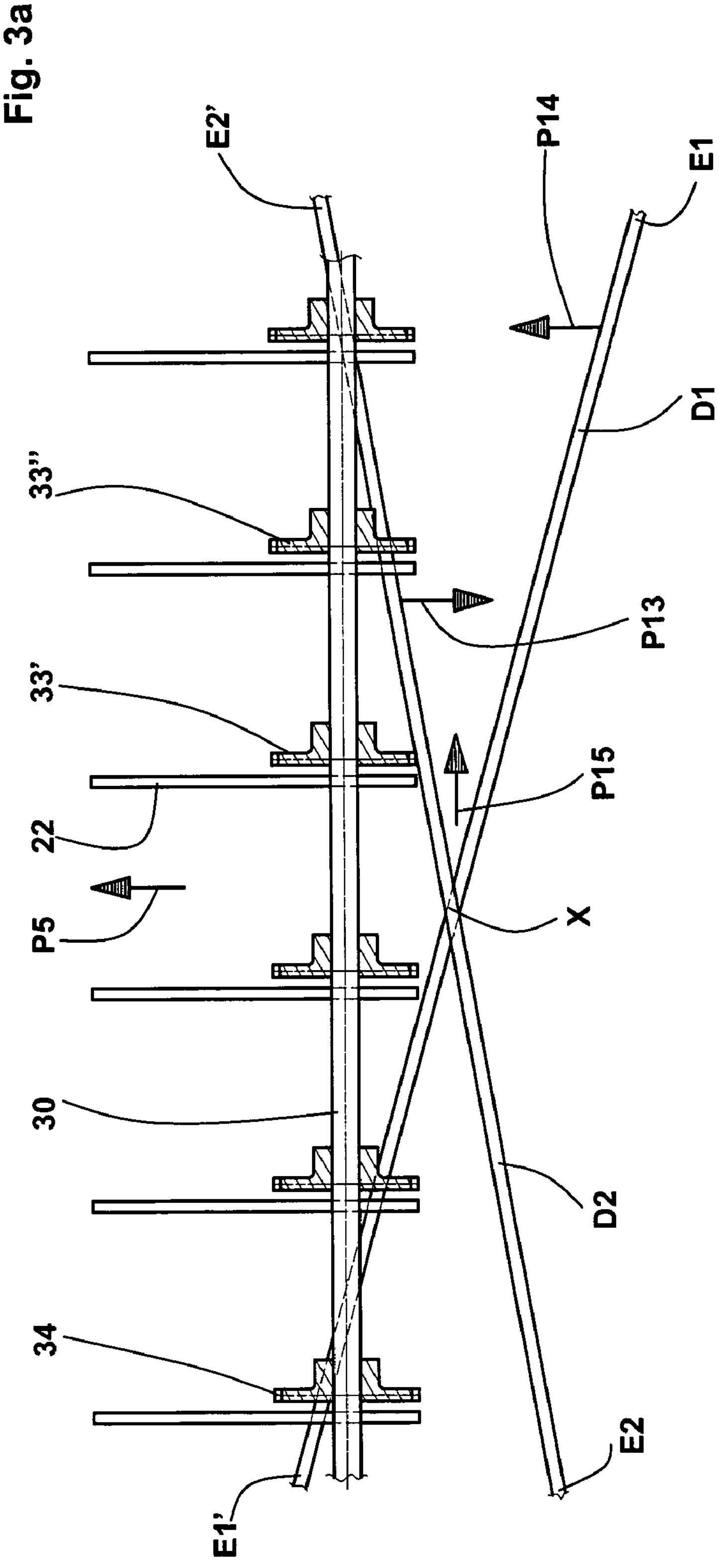
FIGS. 3*a* and 3*b* each shows one basic sketch on the mode of operation of the apparatuses according to the invention.
Figure 3B:
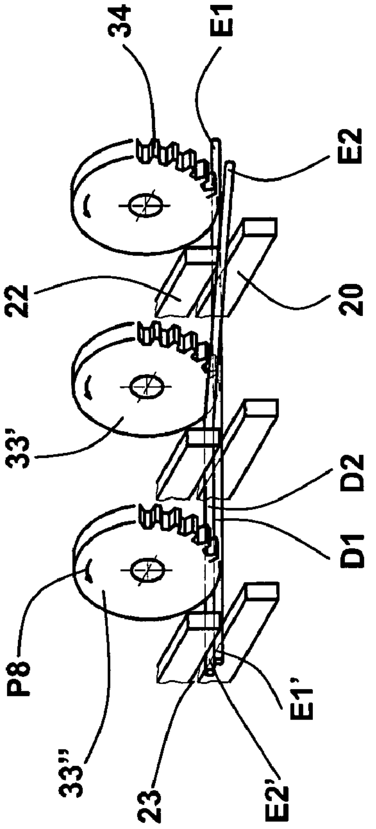

From the partial bundle T of random wires D that is located in the collection tray 6, the magnets 18, rotatable in the direction of the arrow P4, of the portioning device 4 extricate a plurality of wires out of the partial bundle T and fix the wires in a single-layer intermediate bundle Z on the magnets 18. By means of the continuous onward motion of the magnets 18 in the direction of the arrow P4, the wires D are fed on to the slide plate 24, whereupon the wires D are detached from the magnets 18 by the stripper edge 25. The feeding speed of the portioning device 4 is selected such that it is assured that the slide plate 24 will always be filled with wires D. On the slightly downward-inclined slide plate 24, the wires D slide by gravity into the wire chutes 23. However, since the wires D are not in order on the slide plate 24, it cannot be avoided that, as shown in FIG. 1*a*, the wires will also be located in a plurality of layers one above the other on the slide plate 24. The wires D can as a result become wedged in such a way that sliding of further wires into the wire chutes 23 is prevented. To break up this blockage and not even let it occur in the first place, the wires D on the slide plate 24 are processed in the following way by the rotary motion of the combing-out wheels 33: By the continuous rotary motion of the combing-out wheels 33, the wires D located above the bottommost wire layer in the region of the inlet opening of the wire chutes 23 are engaged by the teeth 34 of the combing-out wheels 33 and lift it and fed past the wires on the bottom away from the inlet of the wire chutes 23, as a result of which any blockage of the wire chutes 23 is broken up. As a result of this feeding motion, the bottommost wire layer is simultaneously loosened up somewhat as well, so that the topmost wires can slide or roll more easily into the wire chutes 23. In FIGS. 3*a* and 3*b*, this process is shown schematically in a simplified example having only two wires D1 and D2 crossing one another; at the intersection point X, the wire D1 is on the bottom. The crossing wires D1 and D2 one on top of the other can initially, each separately by their ends E1' and E2', respectively, enter the wire chutes 23 and slide downward until such time as the intersection point X of the two wires D1; D2 arrives at the entrance to the wire chutes 23. Since the intersection point X is twice the thickness of a single wire, the two wires D1, D2 cannot slide farther, and they block one another. This blockage is broken up according to the invention by the combing-out wheel 33' located closest to the intersection point X, because it engages the upper wire D2, as shown in FIG. 3*b*, and pulls the end E2' some distance out of the wire chutes 23 in the direction of the arrow P13. As a result of this motion of the wire D2, the lower wire D1 comes free somewhat, and its free end E1 can follow after and slide in the direction of the arrow P14 into the wire chutes 23. After this motion, the intersection point X migrates in the direction of the arrow P15 toward the end E2', remaining in the wire chutes 23, of the upper wire D2. The adjacent combing-out wheel 33" now enters the engagement position, engages the wire D2, and pulls the end E2' still farther out of the wire chutes 23, so that the free end E1 of the wire D1 can slide after it farther into the wire chutes 23. This process is repeated for the following combing-out wheels 33 until such time as the end E2' of the upper wire D2 has been pulled all the way out of the wire chutes 23; as a result, the intersection point X disappears, and the lower wire D1 can slide or roll all the way into the wire chutes 23. The originally upper wire D2 now likewise rests flat on the slide plate 24 and immediately afterward can likewise slide or roll into the wire chutes 23. In FIG. 3*b*, a further instance of blockage is shown, in which the end E2' of the upper wire D2 is located farther downward in the wire chutes 23 than the end E1' of the lower wire D1. In this case, once again the upper wire D2 is engaged by the combing-out wheel 33', and the end E2' of the upper wire D2 is pulled out of the wire chutes 23, and the end E1 of the lower wire D1 is pushed out as well by the end E2 of the upper wire D2. The adjacent combing-out wheel 33" then comes into engagement and pulls the end E2' farther out of the wire chutes 23. This process repeats, analogously to the example of FIG. 3*a*, until such time as the blockage has been undone and the wire D1 and after it the wire D2 can slide or roll into the wire chutes 23. The apparatus according to the invention is also capable of combing out even a plurality of blocked wires from the wire chutes 23.

Figure 4:
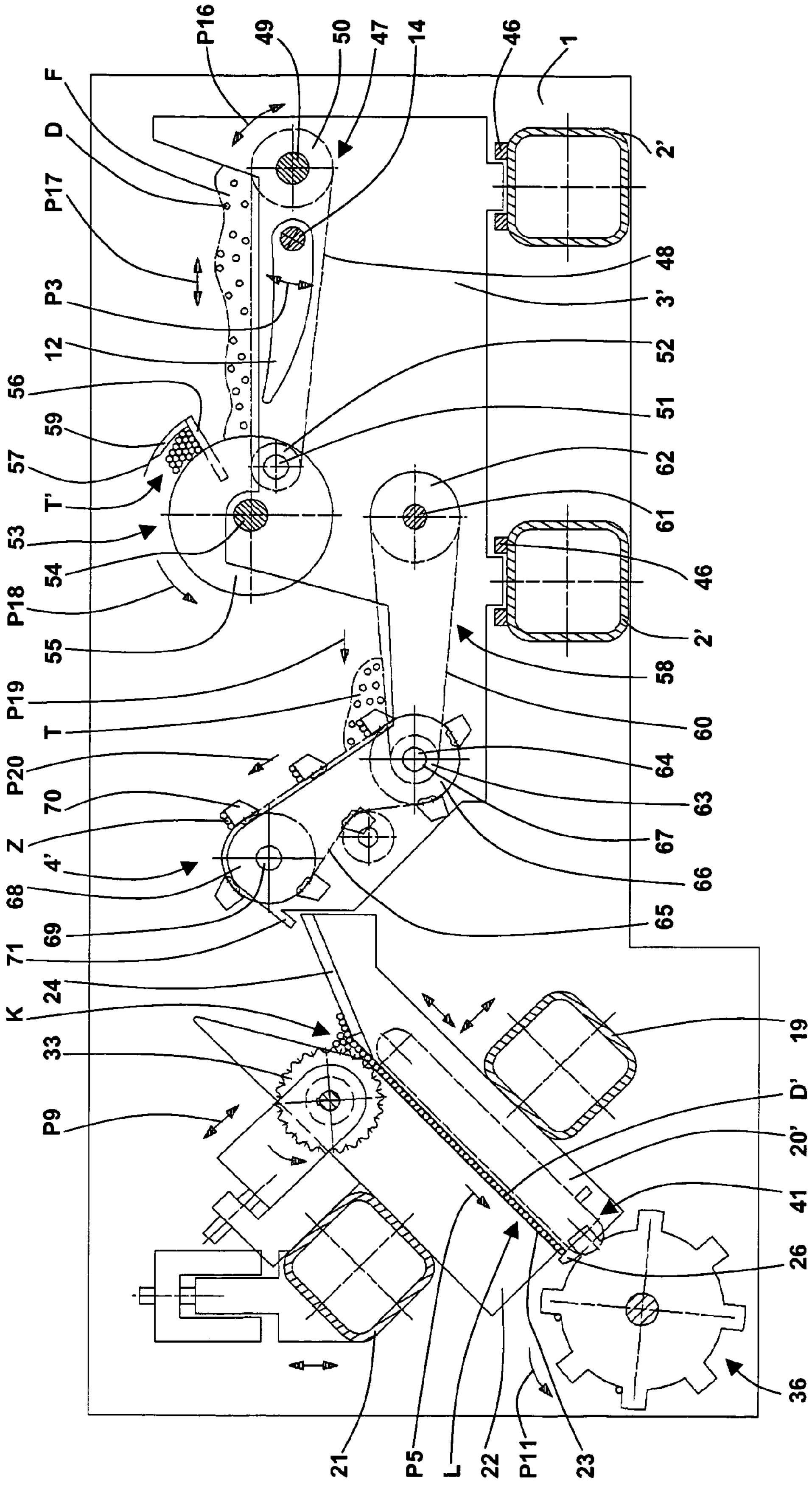
FIG. 4 shows a schematic side view of a further exemplary embodiment of an apparatus according to the invention.

The exemplary embodiment of an apparatus of the invention shown schematically in FIG. 4 is preferably employed for wires of nonmagnetic material and with a smooth surface. The apparatus has two stationary, vertical side plates 1, which are joined by two crossbeams 2'. The crossbeams 2' carry a bundle holder 3' for the loose, random wire bundle B, and the bundle holder 3' is displaceable on guide rails 46 of the bundle holders 3' parallel to the longitudinal direction of the wires D of the wire bundle B. The bundle holder 3' comprises two spaced-apart metal plates, which extend outward, past the operative range of a portioning device 4', as far as the slide plate 24.

Extending parallel to the bundle holder 3' is a fanning device 47, which has two horizontally extending fan chains 48. Each fan chain 48 is driven in the directions of the double arrow P17 by a drive wheel 50, disposed in a manner fixed against relative rotation on a common shaft 49 supported in the bundle holder 3' and drivable in the directions of the double arrow P16, and is guided over a deflection wheel 52 disposed on a common shaft 51. The fanning device 47 fans out the wires D of the wire bundle B by means of a shaking motion in the directions of the double arrow P17 until such time as the wires D rest in fanned-out but still random order on the fan chains 18. Next, the fan chains 48 feed the wires D, in controlled fashion, into the operative range of a preportioning device 53. The preportioning device 53 has two disks 55, disposed in a manner fixed against relative rotation on a shaft 54 that is supported in the bundle holder 3', which are driven in the direction of the arrow P18. The two disks 55 are joined by a bucket receptacle 56, extending parallel to the shaft 54, which carries a bucket 57 that extends coaxially to the disks 55. By the rotary motion of the disks 55, with the aid of the bucket 57, a partial bundle T' of the fanned-out wire layers F is combed out and transferred to a downstream conveyor device 58. The quantity filling the bucket 57 can be adjusted by corresponding radial adjustment of the bucket receptacle 56. To facilitate combing out the wires D from the fanned-out wire layer F, the bucket 57 has an adjustable cutting edge 59 located on the inside, which pushes the wires apart upon takeover by the bucket 57.

The conveyor device 58 has two conveyor chains 60, extending approximately horizontally, which extend into the operative range of the portioning device 4' and are each driven by a respective drive wheel 62 in the direction of the arrow P19; the drive wheels 62 are disposed in a manner fixed against relative rotation on a common shaft 61 supported in the bundle holder 3'. Each conveyor chain 60 is guided over a deflection wheel 63, which is disposed in a manner fixed against relative rotation on a common shaft 64 supported in the bundle holder 3'.

The portioning device 4' has two positioning chains 65, extending obliquely upward, which are driven by a drive wheel 66 in the direction of the arrow P20. The drive wheels 66 are connected in a manner fixed against relative rotation to a shaft 67 supported in the bundle holder 3'. The positioning chains 65 are guided over deflection wheels 68, which are disposed on a common shaft 69 supported in the bundle holder 3'. The positioning chains 65 are connected by a plurality of uniformly distributed driver strips 70, which are designed such that a small number of wires D can be driven as an intermediate bundle Z. The driver strips 70 of the positioning chains 65 comb some wires D out of the partial bundle T' and feed them onto the slide plate 24 and there, analogously to the exemplary embodiment of FIGS. 1*a* and 1*b*, form the bundle K to be combed out; the wires are stripped off from the driver strips 70 by a stripper edge 71 disposed on the bundle holder 3'. The slide plate 24 corresponds to the exemplary embodiment described in conjunction with FIGS. 1*a* and 1*b* and is disposed on lower guide ledges 20'. The lower guide ledges 20' correspond to the lower guide ledges 20 of the exemplary embodiment described in conjunction with FIGS. 1*a* and 1*b* and differ only in the fact that they have no stripper edge in the region of the portioning device 4'. Within the scope of the invention, it is possible to use a plurality of positioning chains, preferably distributed uniformly parallel to the length of the wires, the positioning chains not being joined together but having individual driver elements, instead of the driver strips.

The wires D of the bundle K to be combed out that are located on the slide plate 24 are then, as has already been described for the previous exemplary embodiment (FIGS. 1*a* through 3*b*), separated and delivered via the wire chutes 23 to the ejector 36.

It is understood that the method described and the exemplary embodiments shown can be designed in various ways within the scope of the general concept of the invention. Within the scope of the invention, it is possible to use the portioning device 4, operating by magnet force, of the exemplary embodiment of FIGS. 1*a* and 1*b* as a portioning device in the exemplary embodiment of FIG. 4. It is also possible within the scope of the invention to employ the portioning device 4', operating with positioning chains, of the exemplary embodiment of FIG. 4 as a portioning device in the exemplary embodiment of FIGS. 1*a* and 1*b*.

I claim:

1. A method for extricating and transferring wires cut into lengths from a loose, random wire bundle into a single layer of wires having parallel longitudinal axes, the method comprising the steps of:

spreading out at least a portion of wires in a loose random wire bundle B to form a spread out set of random wire layers F;

extracting a partial bundle T from the spread out set of random wire layers;

putting the partial bundle T into reach of a portioning device;

using the portioning device to extract, from the partial bundle T, a set of wires as an intermediate bundle Z and for forming a bundle K to be disentangled;

putting the bundle K to be disentangled into reach of a set of disentangling devices;

using the disentangling devices to successively engage and disentangle the individual wires of the bundle K to be disentangled; and successively sliding the disentangled individual wires on an inclined surface downward by gravity into a single layer of wires having parallel longitudinal axes.

2. The method of claim 1, wherein the extracting step comprises extricating a partial bundle T' from the spread out set of random wire layers for forming the partial bundle T, and putting the partial bundle T' into reach of a conveyor device.

* * * * *